United States Patent
Bietzer et al.

[11] Patent Number: 5,868,281
[45] Date of Patent: Feb. 9, 1999

[54] NON-SPILL BOTTLE CAP

[75] Inventors: Steven Bietzer, Sunnyvale; Brian M. Adams, Newark; Daniel Luch, Morgan Hill, all of Calif.

[73] Assignee: Portola Packaging, Inc., San Jose, Calif.

[21] Appl. No.: 785,201

[22] Filed: Jan. 17, 1997

Related U.S. Application Data

[63] Continuation-in-part of Ser. No. 441,322, May 15, 1995, Pat. No. 5,687,865.

[51] Int. Cl.$^6$ .................. B67D 5/00; B65B 1/04; B65D 39/00
[52] U.S. Cl. .................. 222/83.5; 141/352; 141/354; 141/364; 215/253; 215/254
[58] Field of Search ............... 222/83.5; 141/18, 141/351, 352, 353, 354, 364; 215/253, 254

[56] References Cited

U.S. PATENT DOCUMENTS

| Re. 32,354 | 2/1987 | Savage | 222/81 |
|---|---|---|---|
| 4,256,233 | 3/1981 | Harding | 215/254 |
| 4,699,188 | 10/1987 | Baker et al. | 141/18 |
| 4,784,296 | 11/1988 | Bullock | 222/153.07 |
| 5,031,676 | 7/1991 | Ulm | 141/346 |
| 5,121,778 | 6/1992 | Baker et al. | 141/346 |
| 5,232,125 | 8/1993 | Adams | 222/83.5 |
| 5,318,198 | 6/1994 | Micek et al. | 222/143 |
| 5,513,763 | 5/1996 | Adams et al. | 215/254 |
| 5,687,865 | 11/1997 | Adams et al. | 215/253 |
| 5,711,441 | 1/1998 | Adams et al. | 222/541.3 |

FOREIGN PATENT DOCUMENTS

WO 903919  4/1990  WIPO .

*Primary Examiner*—Andres Kashnikow
*Assistant Examiner*—Keats Quinalty
*Attorney, Agent, or Firm*—Julian Caplan Flehr Hohbach Test Albritton & Herbert LLP

[57] ABSTRACT

A two-piece cap for a water bottle comprises a main cap which has an annular top disk formed with a depending central well having three levels, each of a slightly smaller diameter. The main cap skirt which depends from the periphery of the top disk has an upper cylindrical portion formed with a truncated internal screw thread which merges into a horizontal bead extending about 180° around the interior of the cap and terminates in a reverse thread portion which extends upward to merge with the leading edge of the truncated screw thread. A first vertical score line extends from the bottom edge of lower skirt portion to the upper edge of the slanted portion. A second vertical score line, spaced a short distance from the first vertical score line, extends from the bottom edge of the lower skirt portion to the top disk. A plug having a closed bottom and a smooth exterior fits into the bottom of the well. The plug has an upper taper to assist in inserting the plug into the bottom of the well followed by three levels, each of slightly larger diameter to seal the central well. An external bead limits inward movement of the plug into the well. An internal bead in the upper end of the plug seats in a groove adjacent the upper end of a water dispenser tube.

10 Claims, 5 Drawing Sheets

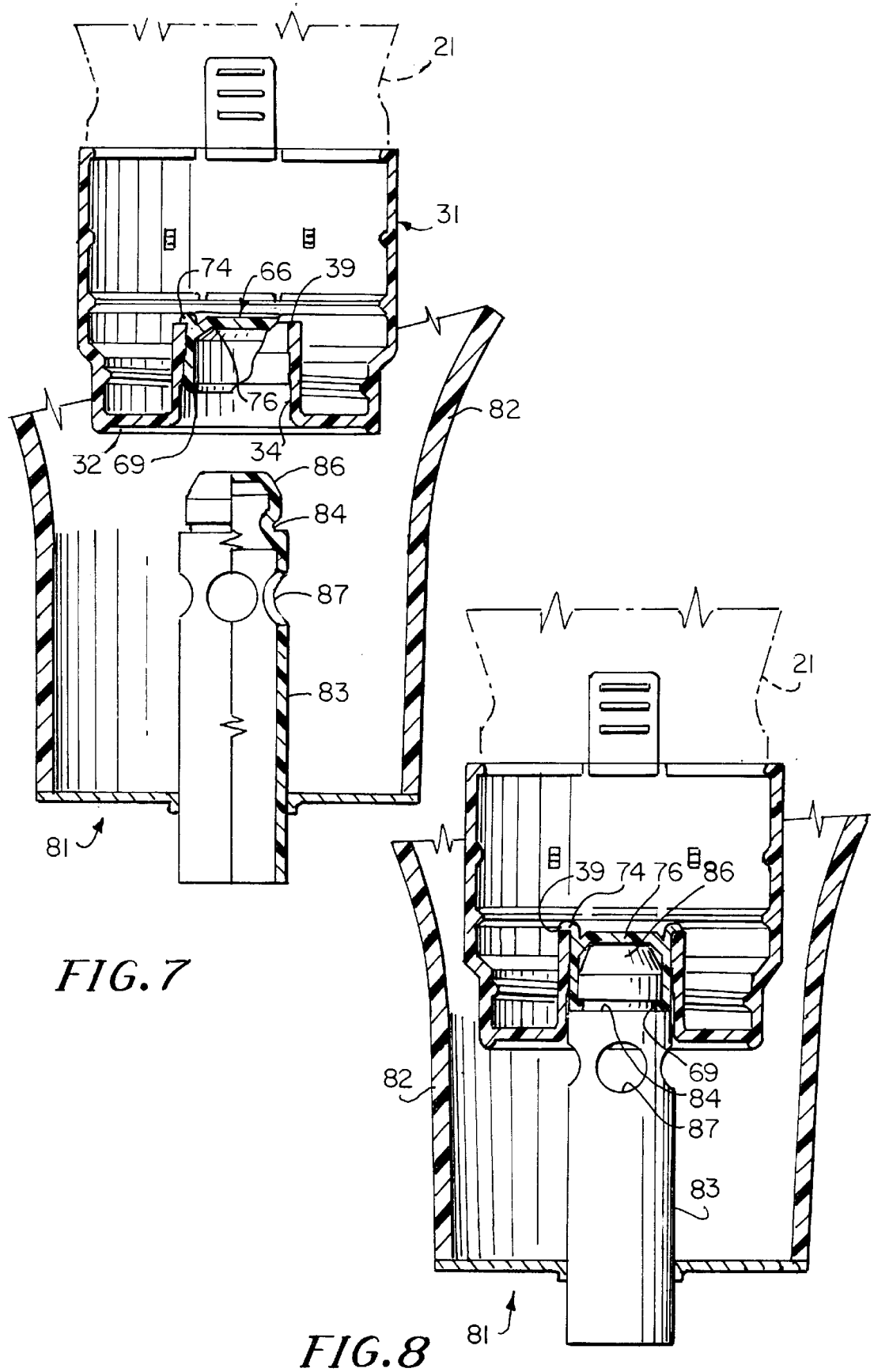

NON-SPILL BOTTLE CAP

CROSS-REFERENCE TO RELATED APPLICATION

This application is a continuation-in-part of application Ser. No. 441,322, filed May 15, 1995, now U.S. Pat. No. 5,687,865 issued Nov. 18, 1997.

BACKGROUND OF THE INVENTION

1. Field of the Invention

This invention relates to a new and improved bottle cap having a smooth wall plug for use in water dispensers. More particularly the invention relates to a cap of the "non-spill" type used with a water dispenser which displaces a plug from a well in the cap to permit water to be dispensed and then, when the bottle is removed from the dispenser, causes the plug to be replaced in the well. Further, the invention relates to structure of the main cap which fits on the bottle.

2. Related Art

Prior patents of the general type of the present application include U.S. Pat. Nos. 5,370,270 and 5,232,125 which disclose a plug closing off a central sleeve in a cap fitting on the neck of a water container. The plug is formed with a plug sleeve fitting into the cap sleeve and an end closing off the plug sleeve. Such a cap is intended to be used on a container which is inverted and lowered into a dispenser to prevent spillage during inversion. However, such a plug has been retained in the cap sleeve by a snap-in fit, wherein an internal bead in the sleeve snaps into a groove in plug skirt. The present invention differs from such structures in that the plug is retained in place in the cap sleeve by friction, rather than a snap fit, until such time as a probe on the dispenser has locked onto the plug.

Prior cap structures shown in U.S. Pat. Nos. 5,513,763 and copending application Ser. No. 08/436,936 are used with screw threaded container necks and are formed with threads which are shaped so that the cap cannot be unscrewed so long as the cap is intact. The present application includes such a feature but the thread structure is considerably simplified.

U.S. Pat. No. 5,121,846 discloses a cap which seals onto the neck of a large container. The present invention in one of its embodiments employs such a cap but incorporates therein a central sleeve closed by a plug held therein by friction.

SUMMARY OF THE INVENTION

A principal purpose of this invention is to provide a container cap which need not be removed before the container is inverted and lowered into a water dispenser. Hence spillage which occurs after removal of conventional caps is eliminated, as is possible spillage when a part-full bottle is removed from a dispenser.

A non-spill feature of the invention relates to a plug which closes off the bottom of a well formed in the main cap top disk. When the bottle is inverted and lowered into a dispenser, a dispenser tube engages the plug. By reason of friction between the plug and the well, the plug remains in position until the dispenser tube locks onto the plug. Further lowering of the bottle into the dispenser causes the tube to push the plug out of the well so that water may be dispensed through the tube. When the bottle is removed from the dispenser, upward movement of the bottle causes the tube to pull the plug back into the well and to seat the plug therein before the tube is disconnected from the plug.

The outside face of the plug wall has its largest diameter at its lower end whereas the cap sleeve into which the plug fits has its lower end formed with a land and the surface above the land of a larger diameter. The land engages the largest portion of the plug wall when the plug is fully seated. The height of the land is selected so that there is resistance to movement of the plug until the dispenser tube has locked onto the plug.

Accordingly a feature of the invention is the fact that the present invention does not require that beads be formed on the plug to engage the wall of the well in order to hold the plug in place for a sufficient time for the tube to lock onto the plug. This simplifies the manufacture and functioning of the plug.

The main cap which fits onto the neck of a water bottle may have a thread which engages the threads which are conventionally formed on bottlenecks. An optional flow-in liner on the cap top disk restrains unintentional unscrewing of the cap. In another feature of the invention, a snap-on cap is employed.

Another feature of the main cap is the fact that it may be removed from the bottleneck merely by pulling upward on a tear tab extending downward from between two vertical score lines, one extending only to the extreme top of the cap and the other extending partially upwardly with respect to the total height of the cap. This feature facilitates removal of the cap. The uneven lengths of the score lines cause the user to lift the cap at an angle, which facilitates removal of the cap from the neck.

In normal usage, the cap may screwed or pressed onto the container neck. A locking bead on the wall of the cap engages a bead conventionally formed on the exterior of the container neck. When it is necessary to remove the cap (e.g., upon return of the bottle for refilling), a tear tab is gripped and pulled upwardly, causing the internal bead of the cap which engages the container bead to be severed and permitting the cap skirt to expand outwardly so that the cap may be lifted off the neck. For customers not using dispensers having tubes engaging the plug, the bottle may be opened in similar fashion.

BRIEF DESCRIPTION OF THE DRAWINGS

The accompanying drawings, which are incorporated in and form a part of this specification, illustrate embodiments of the invention and, together with the description serve to explain the principles of the invention.

FIG. 7 is a schematic view showing a step in the lowering of a container into a dispenser.

FIG. 8 is a view similar to FIG. 7 of a subsequent step.

DETAILED DESCRIPTION OF THE PREFERRED EMBODIMENT

Figure 1A:
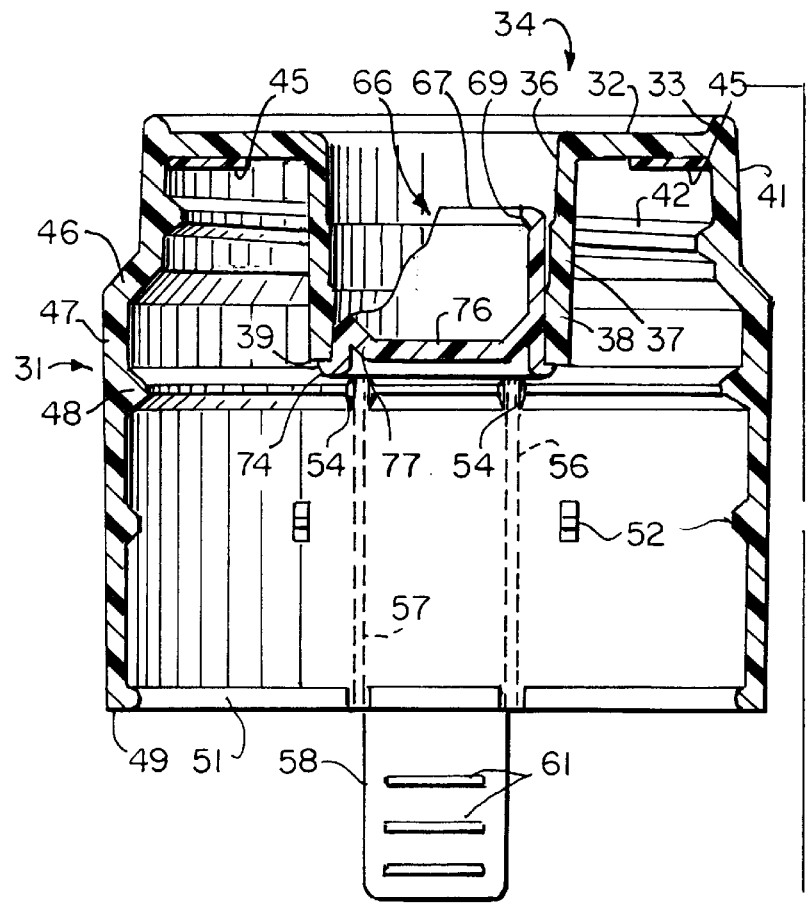
FIG. 1A is an exploded view showing the cap of the present invention in section and a portion of a bottle neck to which it is to be applied.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As shown in FIGS. 1–5, retainer 20 is a large container such as a 5-gallon or 6gallon bottle having container neck 21 at its upper end in which water is conventionally sold for use in water dispensers. One side 16 of container 20 has a protrusion 17 which fits into a mating depression (not shown) in the opposite side to stabilize stacking such containers on their sides. Upper portion 22 having an upper lip 25 is substantially vertical, having a conventional external thread 23. Thread 23 is related relative to protrusion 17 so that if the protrusions 17 are orientated as containers 20 proceed along a filling line, caps 31 may be similarly related so that the threads 41 of the caps are orientated. Below upper portion 22 is an external enlarged bead 24, below which is an outwardly-downward slanted portion 26 which merges with the lower neck portion 27. Upper end 28 at the top of upper portion 22 is inwardly slanted. It will be understood that the structure of neck 21 is subject to variation and that threads may be eliminated therefrom.

Main cap 31, which fits over neck 21, comprises a top disk 32 formed with a recess 33 in which a circular label (not shown) may be inserted. Centrally of the disk 32 is a well 34 having an open bottom end. The interior of well 34 has three separate levels, namely an upper level 36, an intermediate level 37, and a lower level 38 each of increasingly smaller diameter. Level 38 terminates in a bottom edge 39. Level 38 may be termed a "land" to frictionally engage plug 66, hereinafter described.

Upper skirt 41 depends from the periphery of disk 32. The exterior of upper skirt 41 is cylindrical. An internal thread 42 extends approximately around the interior of the upper skirt portion 41. To reduce any tendency of the cap to unscrew, flow-in liner 45 may be deposited in a ring or the underside of top 32 at a location where it will seal against lip 25 of neck 21. Liner 45 may be of any suitable material, such as a blend of ethylene vinyl acetate.

Below upper skirt 41 is an outward-downward conical portion 46 terminating in generally externally cylindrical lower portion 47. Formed on the interior of portion 47 is a locking bead 48 which fits under bead 24 of neck 21 to hold the cap in place. The bottom edge 49 of portion 47 is formed with an internal bottom bead 51. Positioned around the interior of lower portion 47 is a plurality of stand-offs 52 (here shown as six in number) which assist in seating the cap 31 on the neck 21 by engaging bead 24 and easing the outward expansion of the skirt portion 47 to clear bead 24. The presence of stand-offs 52 reduces the frictional resistance to seating of the cap 31.

Figure 1:
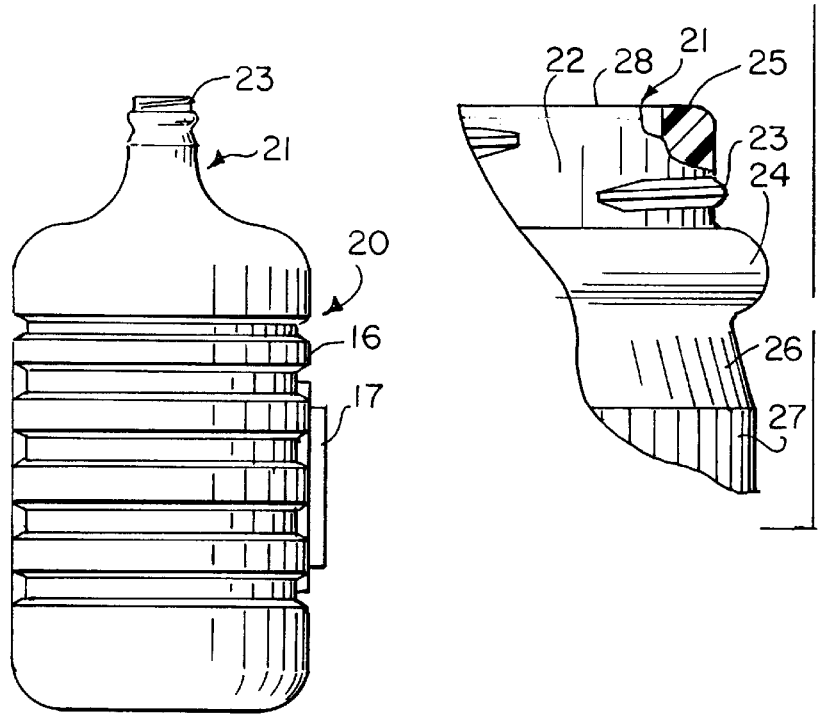
FIG. 1 is an elevational view of a bottle with which the invention is used.
Figure 3:
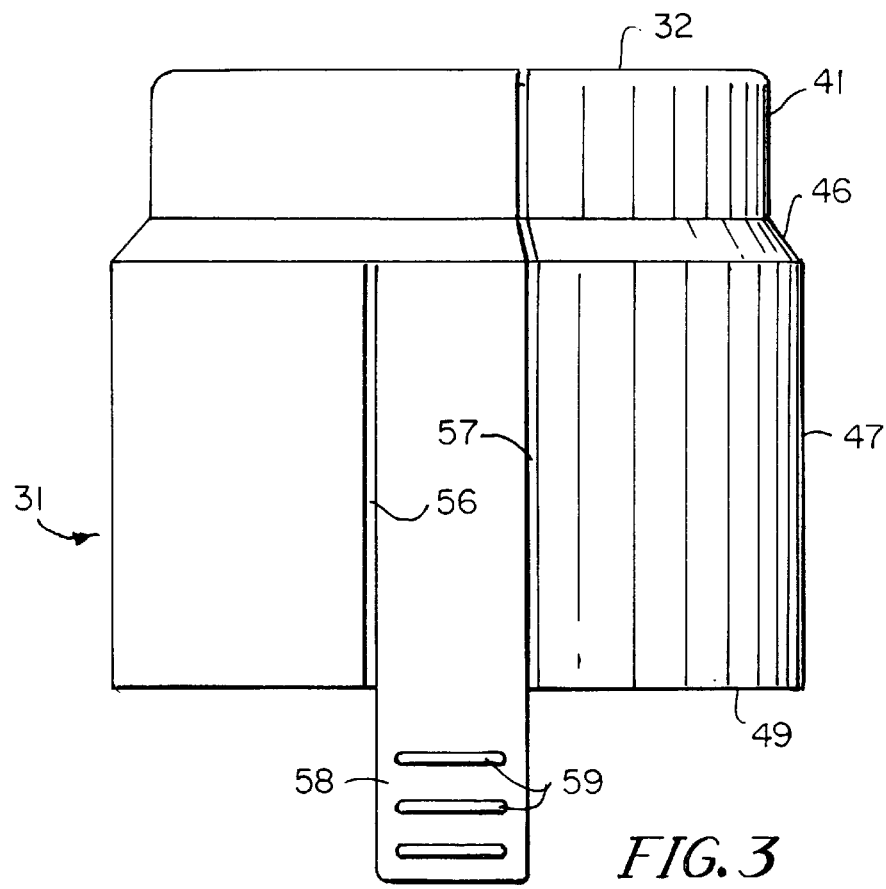
FIG. 3 is a side elevational view of the cap.
Figure 2:
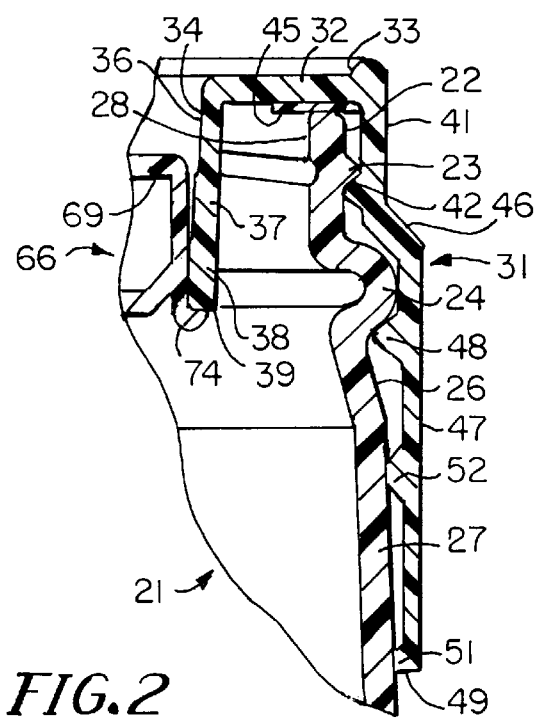
FIG. 2 is a fragmentary sectional view showing a portion of the container neck and cap assembled.

A first vertical score line 56 extends up from bottom edge 49 to the upper end of slanted portion 46. A second vertical score line extends upward from bottom edge 49 to the top of upper skirt 41. Score lines 56 and 57 are shown as external. As shown in FIG. 1 interruptions 54 are formed in locking bead 48 in registry with score lines 56 and 57. Depending below edge 49 between score lines 56 and 57 is a tear tab 58 having external transverse gripping ribs 59 and internal transverse gripping ribs 61. When it is necessary to remove cap 31, the user grips tab 58 and pulls upward, tearing the skirt along lines 56, 57 allowing the skirt portion 47 to expand so that the bead 48 disengages from below bead 24. By pulling upwardly, the cap 31 may be separated from the neck 21. Because of the difference in length of lines 56 and 57, the user pulls the cap away from the neck at an angle, reducing any tendency of the cap to bind on the neck. Tear tab 58 may be used to orient the cap, as well understood in this art.

The bottom end of well 34 is closed by plug 66. Plug 66 has a plug skirt 70 having an upper edge 67 below which is an outward-downward external taper 68 on the exterior of skirt 70. An internal bead 69 is formed immediately below edge 67. The exterior thereof is formed with three levels of increasing diameter, namely upper level 71 which is generally cylindrical, intermediate level 72, which has a slight taper and cylindrical lower level 73. On the exterior of the lower end of level 73 is an external bead 74 of greater diameter than bottom edge 39. Plug 66 is closed off by end 76 which is spaced upwardly from bead 74 and is formed with inward-upward slanted connector 77 which merges with the upper end of lower level 73.

Figure 4:
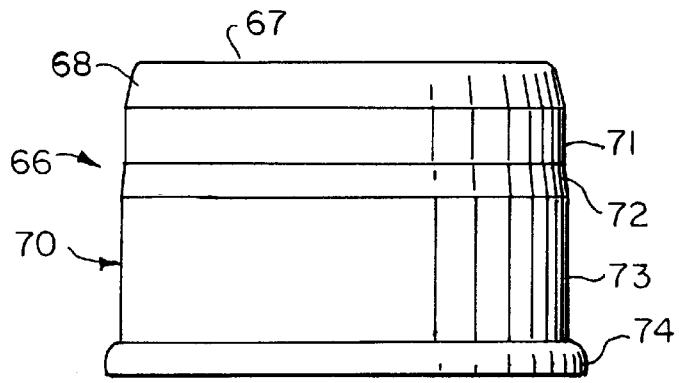
FIG. 4 is a side elevational view of a plug used with a cap.
Figure 5:
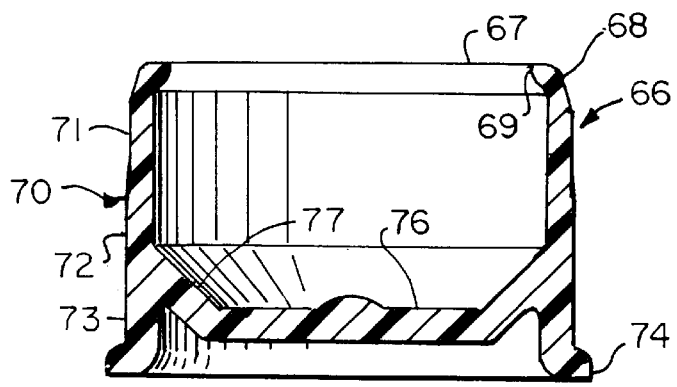
FIG. 5 is a vertical sectional view of the structure of FIG. 4.
Figure 6:
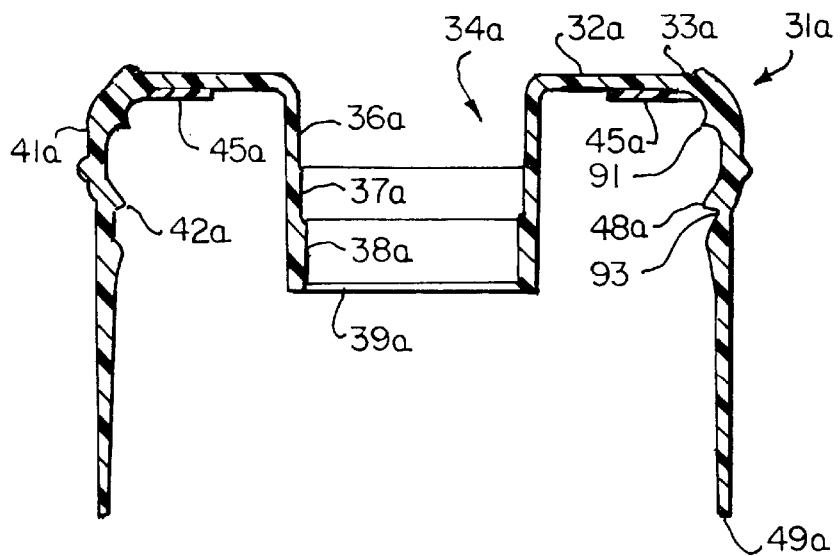
FIG. 6 is an enlarged sectional view of a portion of a modified cap.

Referring to FIG. 6 and comparing with FIGS. 4 and 5, land 38a is of a diameter slightly less than the diameter of portion 73 (e.g. 0.765 in. vs. 0.725 in.) and is shorter in a vertical sense than the overall plug height. Thus there is frictional restraint to movement of plug 66 relative to well 34a, and the height difference allows bead 69 to radially expand to facilitate coupling of plug 66 with dispenser upper end 86.

Figure 9:
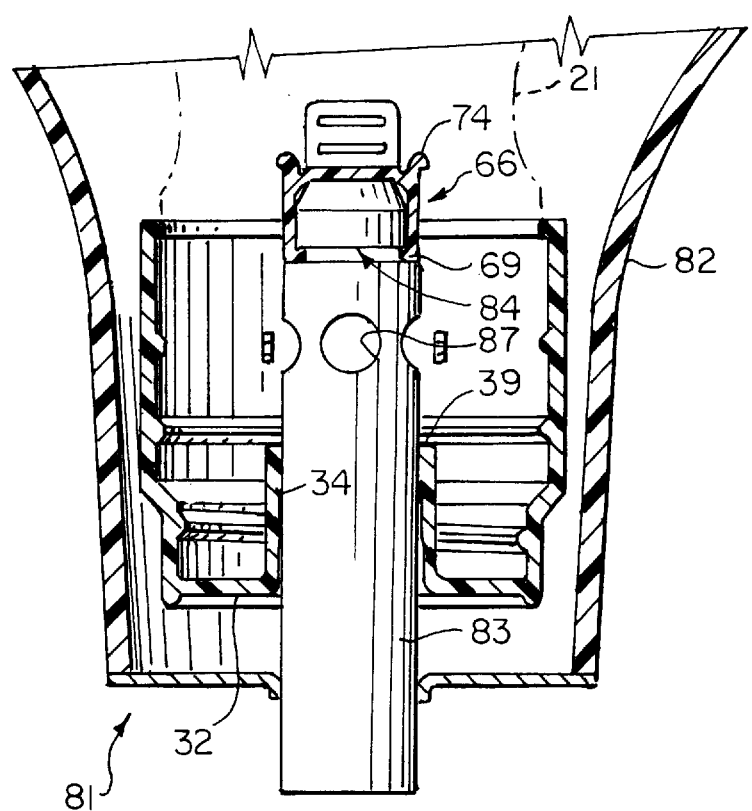
FIG. 9 is a view similar to FIG. 7 showing the plug removed from the well so that water may be dispensed from the dispenser tube.

In use, the container 21 and cap 31 are inverted from the positions shown in FIGS. 1–5. As shown in FIGS. 7–9, the inverted container is lowered into a dispenser 81 which has a guide 82 to receive the exterior of cap 31. Positioned centrally of guide 82 is a vertical dispenser tube 83 formed with a groove 84 shaped to receive internal bead 69 at a location spaced downwardly from the rounded upper end 86 of the tube. Below groove 84 is a hole 87 which communicates with the hollow interior of the tube 83 to permit dispensing of liquid.

It will be understood that when the container is to be installed in a water dispenser the container is inverted from the position of FIGS. 1–4 with cap 31 in place on neck 21. As shown in FIG. 7–9, as the container neck 21 is lowered into the guide 22, the upper end 86 of tube 83 enters the interior of plug 66. Portion 73 of plug 66 frictionally engages land 38 of well 34 so that the plug 66 remains in initial position in the well until the internal bead 69 has seated in groove 84 (see FIG. 8). Further lowering of the container causes the end 86 to push the plug 66 upwardly until it is disengaged from well 34 (see FIG. 9). At this position, hole 87 is located in the liquid within the container and allows the liquid to flow through the tube 83 whenever the dispenser valve (not shown) is opened.

When it is desired to remove the container from the dispenser, the user lifts the container, causing neck 21 to elevate. As the container is raised, cap 31 and well 34 are raised until plug 66 is back into its initial position in well 34. External bead 74 encounters bottom edge 39, whereupon further raising of the container causes tube 83 to be disconnected from plug 66.

FIG. 6 shows a modified cap 31a which snaps onto a neck (not shown but well known in the art) which has no threads. Ring 48a snaps under a bead on the neck and also pulls the top 32a downwardly relative to the neck to insure sealing of the cap to the neck and optional liner 45a may facilitate such sealing. Bead 91 seals against the top edge of the neck bead. In this form of the invention a circumferential tear line 93 is formed under ring 48a, whereby the entire cap skirt below line 93 may be torn away and the cap portion above line 93 may be used repeatedly as a reclosure cap.

The well 34a of FIG. 6 may be identical to that of the preceding modification. Portion 38a may have a diameter of 0.725 in. and a vertical height of 0.245 in. Portion 37a may have a diameter of 0.745 in. and portion 36a of 0.760 in. Plug 66 shown in FIGS. 4 and 5 is received in well 34a. Taper 68 may be at 15° to the vertical and of a length of 0.80 in. Level 71 may be of a diameter of 0.755 in. and a height of 0.10 in. Level 72 is at 5° to the vertical. Level 73 is of a diameter of 0.765 and a length of about 0.3 in. All dimensions given in this paragraph are representative. It will be noted that Level 73 is shown as of a diameter 0.04 greater than land 38a. Hence there is frictional resistance to sliding when probe upper end 86 encounters internal bead 69, enabling plug 66 to lock onto the probe before the plug is displaced to the position of FIG. 9.

In other respects the modification of FIG. 6 resembles that if FIGS. 1–6 and the same reference numerals followed by subscript a are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A non-spill cap for a bottleneck used on a water dispenser of the type having a dispenser probe, said non-spill cap comprising a main cap having an annular top, a skirt depending from the periphery of said top, means on said skirt for engagement with the bottleneck, and a well formed in the center of said top, said well having a lower edge, a land having a first diameter formed on the interior of said well immediately above said lower edge, said well above said land being of larger diameter than said first diameter, and a hollow plug detachably received in said well, said plug having a plug skirt having an interior and an exterior, a closed end for said plug skirt, an external bead on said plug skirt dimensioned to engage said lower edge of said well to limit movement of said plug into said well, an internal bead on an end of said plug skirt dimensioned to removably lock into a groove formed around the exterior of the probe, said plug skirt exterior having a maximum second diameter adjacent said external bead, said second diameter being sufficiently greater than said first diameter so that said plug remains in said well solely by friction between said well and said plug at said first and second diameters until the probe is inserted into said well, contacts said plug and detachably locks onto said plug by said internal bead fitting into the groove in the probe, and is subsequently forced from said well by further movement of said probe into said well, said plug skirt exterior having no groove into which said land may be seated.

2. A cap according to claim 1 in which said land and said second diameter level are cylindrical.

3. A cap according to claim 2 in which said second diameter and said first diameter are approximately in the ratio of 725 to 750.

4. A cap according to claim 1 in which the interior of said well is formed with a conical intermediate level above said land and an upper level above said intermediate level, said intermediate level being larger than said land and said upper level being larger than said intermediate level.

5. A cap according to claim 1 in which said closed end is adjacent an end of said plug adjacent said external bead.

6. In combination, a bottleneck having an upper end formed with at least one external thread and having an upper lip, said bottleneck comprising the upper end of a container having first orienting means and a cap having a top and a skirt depending from the periphery of said top, said skirt being formed with at least one internal thread to mate with said external thread, and an annular deposit of flow-in liner on the underside of said top adjacent said skirt positioned to seal against and frictionally engage said lip when said cap is assembled on said bottleneck, said cap being formed with second orienting means cooperable with said first orienting means, whereby said external thread and said internal threads are oriented relative to each other.

7. The combination of claim 6 in which said liner is ethylene vinyl acetate.

8. The combination of claim 6 in which said bottleneck is formed with an upper portion, said external thread being formed on said upper portion, and an external bead below said upper portion, said cap skirt comprising an upper skirt portion, said internal thread being formed on said upper skirt portion, an outward-downward slanted portion below said skirt, and a lower skirt portion below said slanted portion and an internal locking bead on said lower portion positioned to engage below said external bead.

9. The combination of claim 6 in which said first orienting means comprises a protrusion on a side of said container.

10. The combination of a claim 6 in which said second orienting means comprises a tab depending below said skirt.

* * * * *